(12) United States Patent
Michaels

(10) Patent No.: US 7,441,189 B2
(45) Date of Patent: Oct. 21, 2008

(54) INSTRUMENTATION INTERFACE DISPLAY CUSTOMIZATION

(75) Inventor: Damon C. Michaels, Marlborough, MA (US)

(73) Assignee: Navico International Limited, St. Helier, Jersey (GB)

( * ) Notice: Subject to any disclaimer, the term of this patent is extended or adjusted under 35 U.S.C. 154(b) by 404 days.

(21) Appl. No.: 11/156,823

(22) Filed: Jun. 20, 2005

(65) Prior Publication Data

US 2007/0006101 A1    Jan. 4, 2007

(51) Int. Cl.
*G06F 15/00* (2006.01)
*G06F 13/00* (2006.01)

(52) U.S. Cl. .................................. 715/700; 715/736
(58) Field of Classification Search ................ 715/700, 715/736, 747, 707, 763–765; 701/200–215
See application file for complete search history.

(56) References Cited

U.S. PATENT DOCUMENTS

| | | | |
|---|---|---|---|
| 4,467,323 A | 8/1984 | Kling et al. | |
| 4,929,943 A | 5/1990 | Baldwin | |
| 4,939,675 A | 7/1990 | Luitje | |
| 4,988,996 A | 1/1991 | Ito | |
| 5,043,727 A | 8/1991 | Ito | |
| 5,063,381 A | 11/1991 | Ito | |
| 5,367,297 A * | 11/1994 | Yokoyama | 340/984 |
| 5,822,335 A | 10/1998 | Danneberg | |
| 6,045,446 A | 4/2000 | Ohshima | |
| 6,273,771 B1 | 8/2001 | Buckley et al. | |
| 6,382,122 B1 | 5/2002 | Gaynor et al. | |
| 6,441,726 B1 | 8/2002 | Voto et al. | |
| 6,703,945 B2 | 3/2004 | Kuntman et al. | |
| 6,826,465 B2 * | 11/2004 | Ishimoto et al. | 701/50 |
| 6,864,806 B2 | 3/2005 | Funayose et al. | |
| 6,900,808 B2 | 5/2005 | Lassiter et al. | |

OTHER PUBLICATIONS

Gold, "A Simple Virtual Voltmeter Using GDI+ and the GP-3 Board," www.c-sharpner.com/code/2003/Dec/GDIPlusMeter.asp, pp. 1-6 (2003).
Mercury Marine, "SmartCraft Ties Together Systems for Optimum Experience," http://www.mercurymarine.com/integrated_technology?makePrintable=1, pp. 1-2 (2004).
Mercury Marine, "SmartCraft SC1000 Monitor," http://mercurymarine.com/smartcraft_sc1000_,monitor?makePrintable=1, pp. 1-2 (2004).
Mercury Marine, "What makes SmartCraft so smart?"http://www.mercurymarine.com/what_makes_smartcraft_so_smart?makePrintable=1, (2004).
Mercury Marine, "SmartCraft SC5000 System View," http://www.mercurymarine.com/smartcraft_sc5000, pp. 1-3 (2005).

(Continued)

*Primary Examiner*—Kevin Nguyen
(74) *Attorney, Agent, or Firm*—Alston & Bird LLP

(57) ABSTRACT

A method of producing an instrumentation interface for a vehicle having a display device may include initializing a display format for the instrumentation interface in accordance with one or more characteristics of the vehicle. The method may further include collecting customization data to configure a display site defined by the display format of the instrumentation interface, and generating the instrumentation interface via the display device in accordance with the display format and the customization data for the display site.

28 Claims, 11 Drawing Sheets

OTHER PUBLICATIONS

Navman, "Navman, your personal onboard Engine Wizard!," http://www.navman.com/marine/products/smartcraft/index.html, pp. 1-6 (1999-2005).

Ar engineering, "SEAviz Virtual Instruments," http://www.marinecomp.com/cruzproseavis.htm, pp. 1-5 (2005).

Teleflex Morse Press Release, "Programmable Display Speeds Evolution of Volvo Penta's Electronic Vessel Control Technology," http://www.wordsun.com/tm11_html, pp. 1-4 (2004).

Volvo Penta, http://www.volvo.com/NR/rdonlyres/9D775A1B-9AC3-4451-8797-7E3BDC2DE370/0/EDC_display.jpg (2005).

Volvo Penta, "Volvo Penta EDC display," http://accessorycatalogue.penta.volvo.se/main.asp?productNode=117253244&language=us, pp. 1-2 (2005).

Volvo Penta, "Volvo Penta Multi Display," http://accessorycatalogue.penta.volvo.se/main.asp?productNode=117253363&language=us, pp. 1-3 (2003).

Macromedia, "Macromedia Flash Animation: Creating Lifelike Motion Blur Effects," pp. 1-8 (1995-2005).

* cited by examiner

INSTRUMENTATION INTERFACE DISPLAY CUSTOMIZATION

RELATED APPLICATION

This application is related to concurrently filed application entitled "Indicator Motion Trail for an Instrumentation Interface Display," a regular, non-provisional application hereby expressly incorporated by reference herein.

BACKGROUND OF THE DISCLOSURE

1. Field of the Disclosure

The disclosure relates generally to vehicle operator information systems and, more particularly, to instrumentation user interface displays for vehicles such as marine vessels.

2. Brief Description of Related Technology

Vehicle operator information systems generally include one or more control panels or consoles that present data gathered from various systems or devices onboard the vehicle. The panels are often arranged in an instrumentation cluster of gauges that together define an operator control area, or helm. Each onboard system can then be monitored simultaneously by the vehicle operator from the operator control area.

Some vehicles, such as marine vessels, present instrumentation challenges and complexities arising from having, for instance, more than one engine. Associated with each engine are typically a number of sensors that monitor respective engine parameters, such as various pressures, temperatures, etc. Complicating matters further for the boat manufacturer or vessel outfitter, the same vessel may often be outfitted with different engines or engine types. The instrumentation requirements, and the resulting arrangement of gauges, can thus vary greatly from boat to boat. In the past, these variations have led to difficulties in establishing the proper connections between all of the sensors and the associated gauges.

A digital communication protocol and corresponding hardware interface was developed to simplify the transmission of engine and other data to the operator control area. Instead of having a dedicated, respective connection between each sensor and gauge pair, a communication network utilized the protocol and hardware interface to handle all of the data transmissions collectively. The protocol standardized communications between the sensors and the gauges, allowing transmissions over a controller area network (CAN) bus to which all of the devices were connected.

These and other developments unfortunately did not address the increasingly cluttered nature of operator control areas. The availability of the CAN bus facilitated increased communications, meaning that additional engine and other parameters could be monitored in the control area. The bus and the rest of the hardware interface also made the installation process less complicated. Meanwhile, vehicle complexity was increasing with the advent of various digital devices for monitoring a wide variety of conditions and variables of interest to the vehicle operator. And with these developments, the instrument panels of the operator control area were often populated with a dedicated analog gauge or display for each onboard sensor or device providing information to the operator. As a result, the operator was often overwhelmed with cluttered instrument panels with a growing number of gauges respectively dedicated to each of the onboard sensors and devices supported by the communication protocol and hardware interface technology.

User interface devices have been developed to replace the standard analog gauge with the intention of making vehicle operation and control more practicable. Such devices handle the data provided by multiple sensors or instruments and, in so doing, reduce the number of multiple, separate devices required in the control area. For instance, the SC1000 device available from Mercury Marine (Fond du Lac, Wis.) combines readouts for a number of instrumentation functions, such as engine speed, fuel range, water depth, and engine oil pressure. Instead of a dial-type, analog gauge with a movable needle, the SC1000 device has a digital, liquid crystal display (LCD) that allows a user to scroll through dedicated readouts of the supported functions. Each dedicated display depicts the numerical digits of the current value of the parameter measured by the function. Another device commercially available from Mercury Marine under the product name SC5000 organizes the instrumentation information in separate detailed display pages provided via an LCD display. Each display page of the SC5000 device presents instrumentation information in a pre-configured, or preset, manner. The series of display pages forms a slide-show approach to providing instrumentation information.

Both of the aforementioned Mercury Marine devices have the capability of automatically detecting or identifying system components connected to the CAN bus. This auto-detection feature is described in U.S. Pat. No. 6,382,122, entitled "Method for Initializing a Marine Vessel Control System," the disclosure of which is hereby incorporated by reference. In operation, the auto-detection feature allows the engine type to determine a standard parameter set to be displayed via the LCD display. For example, if propulsion is provided with a stern drive with troll control capability, the standard parameters include engine temperature, volts/hours, engine speed, etc. Other parameters not monitored by (or relevant to) that engine type are excluded from the display pages of the slide-show.

The automatic detection of system components simplifies the assembly of the operator control area. The boat builder or vessel outfitter need only connect the unit having the LCD display to the CAN bus, and all of the necessary communications with the sensors are established.

While these improvements have reduced instrumentation clutter and eased installation and assembly, the aforementioned instrumentation devices fail to provide instrumentation information in the immediate, or simultaneous, fashion of the analog gauges and conventional instrument panels that they replaced. Specifically, the operator is undesirably forced to toggle between the preset display pages, which may be difficult or inconvenient during attempts to control the vessel. The toggling may be significantly time consuming, inasmuch as the information on each page is typically limited to one or two parameters. Moreover, the standard, pre-set displays of these devices are generally not customizable to meet operator preferences, or for that matter, the preferences of the boat manufacturer or vessel outfitter. Such preferences may change during use for a number of reasons, including, for instance, changing operational conditions or different operational states (e.g., docking, cruising, refueling, etc.). Still further, the pre-set display pages fail to provide the convenient trending information made available naturally via the movement of the needle pointers of the conventional analog gauges. For these reasons, the aforementioned devices at times provide limited benefits over conventional analog gauges during operation and use of the watercraft, such as when an operator wishes to monitor a set of operational parameters concurrently.

SUMMARY OF THE DISCLOSURE

In accordance with one aspect of the disclosure, a method is useful for producing an instrumentation interface for a vehicle. The method includes initializing a display format for the instrumentation interface in accordance with one or more characteristics of the vehicle, and collecting customization data to configure a display site defined by the display format of the instrumentation interface. The instrumentation interface is then generated via a display device in accordance with the display format and the customization data for the display site.

In some cases, the method also includes the step of applying the customization data to configure a mirror display site relative to the first-named display site. The applying step may be implemented automatically based on whether mirroring is appropriate given the one or more characteristics of the vehicle determinative of the display format. Alternatively, or in addition, the applying step is implemented automatically based on whether mirroring is appropriate given a gauge type specified in the customization data.

In certain embodiments, the initializing step includes determining gauge data for the vehicle given the one or more characteristics of the vehicle. The gauge data may specify suitable gauge types for the display site, and the collecting step may include generating a list of the suitable gauge types to prompt a user for selection of a gauge from the list of suitable gauge types for placement at the display site.

The display format may specify a plurality of gauge sites for a display screen of the instrumentation interface available for customization. In some cases, the collecting step includes selecting a gauge for the display site, and the generating step includes determining a gauge range for the gauge in accordance with the display format. The customization data may then include a measurement unit specification such that the gauge range determining step includes converting a default gauge range of the display format to a customized range based on the measurement unit specification.

In one embodiment, the initializing step includes accessing default display data for the display format, such that the method further includes the step of modifying the default display data such that the display format reflects the customization data. The method may then further include the step of storing a representation of the modified default display data reflecting the customization data as a customized display configuration.

The instrumentation interface may include a plurality of gauge display screens such that the collecting step is implemented for a respective gauge display screen of the plurality of gauge display screens.

In accordance with another aspect of the disclosure, a computer program product stored on a computer-readable medium produces an instrumentation interface for a vehicle. The computer program product includes a display initialization routine to determine a display format of the instrumentation interface in accordance with one or more characteristics of the vehicle, a configuration routine to collect customization data to configure a display site defined by the display format of the instrumentation interface, and a display routine to generate the instrumentation interface via a display device in accordance with the display format and the customization data for the display site.

In some cases, the computer program product further includes a display site mirroring routine to apply the customization data to a further display site. The display site mirroring routine may be implemented automatically based on whether mirroring is appropriate given the one or more characteristics of the vehicle determinative of the display format. Alternatively or, in addition, the display site mirroring routine is implemented automatically based on whether mirroring is appropriate given a gauge type specified in the customization data.

In some embodiments, the gauge display initialization routine determines gauge data for the vehicle given the one or more characteristics. The gauge data may specify suitable gauge types for the display site, and the configuration routine may include a user selection routine to list the suitable gauge types for selection of a gauge from the list of suitable gauge types for placement at the display site.

The display format may specify a plurality of gauge sites for a display screen of the instrumentation interface available for customization. The display routine may include a gauge range routine to determine a gauge range in accordance with the display format. The customization data may include a measurement unit specification such that the gauge range routine converts a default gauge range of the display format to a customized range based on the measurement unit specification.

The configuration routine may modify display structure data specified by the display format to reflect the customization data. The configuration routine may then store the modified display structure data as a customized display configuration.

In accordance with yet another aspect of the disclosure, a system for producing an instrumentation interface for a vehicle includes a processor, a computer-readable medium in communication with the processor, and display initialization and generation routines stored on the computer-readable medium and adapted for implementation by the processor. The display initialization routine determines a display format of the instrumentation interface in accordance with one or more characteristics of the vehicle, and the display generation routine generates a display screen of the instrumentation interface that is configured to depict via a display device customized instrumentation data in accordance with the display format.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 1:
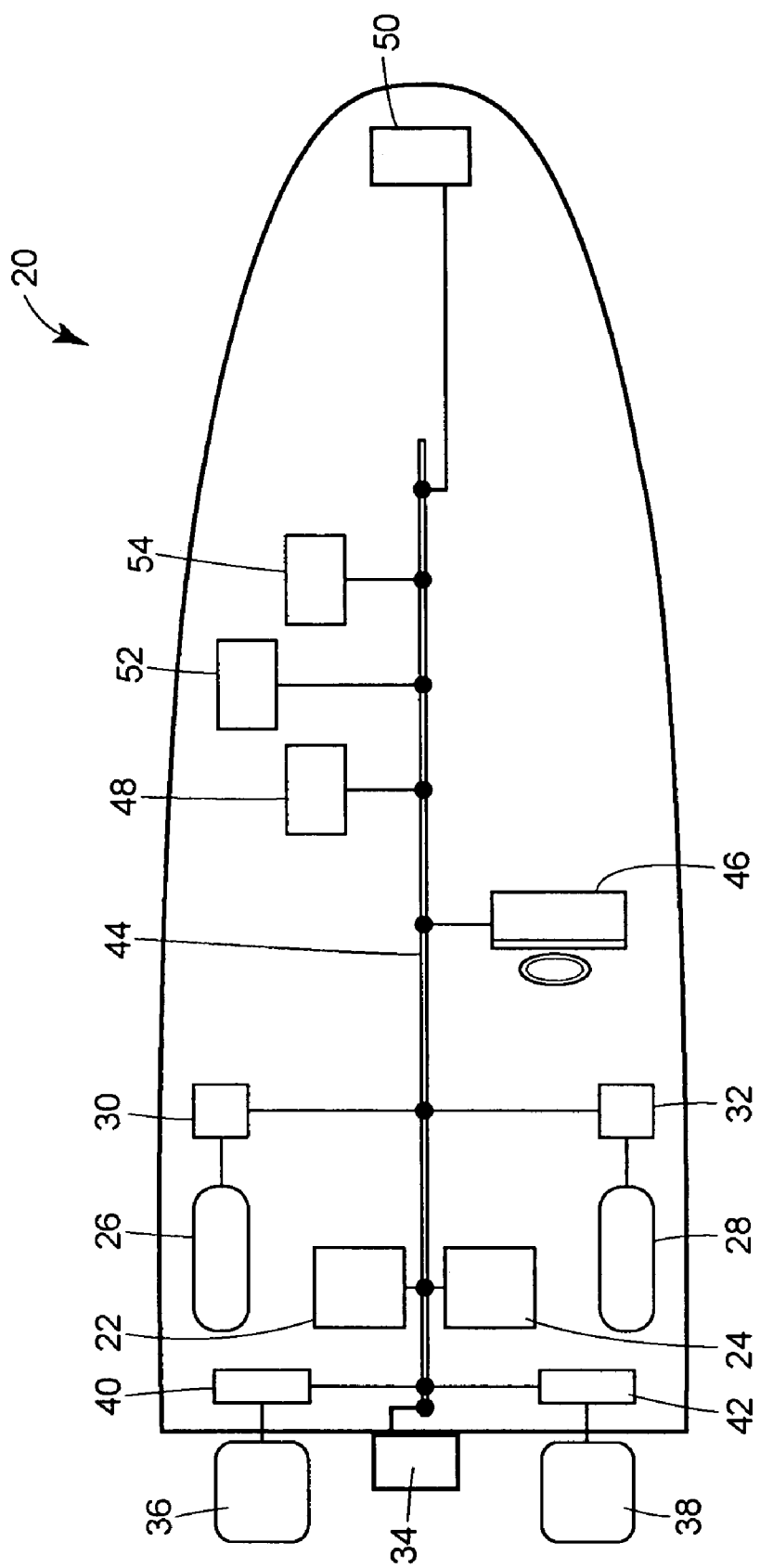
FIG. 1 is a schematic representation of a marine vessel having an instrumentation interface in accordance with one aspect of the disclosure.

While the disclosed instrumentation interface system and method are susceptible of embodiments in various forms, there are illustrated in the drawing (and will hereafter be described) specific embodiments, with the understanding that the disclosure is intended to be illustrative, and is not intended to limit the invention to the specific embodiments described and illustrated herein.

DETAILED DESCRIPTION OF PREFERRED EMBODIMENTS

Disclosed herein are a system and method for generating an instrumentation interface. The instrumentation interface generally provides for the display of data and information collected by a plurality of sensors, instruments and other devices distributed or disposed onboard a vehicle. The instrumentation interface therefore facilitates the control of the vehicle by an operator monitoring the data and information. The disclosed system and method generally addresses the operator's need to monitor the information from a variety of sensors and devices concurrently in an effective and efficient manner. To this end, the disclosed system and method generate the instrumentation interface via an instrumentation interface display having a number of graphically presented instrumentation elements rendered via a display device onboard the vehicle. More generally, the disclosed system and method are directed to the generation of customized instrumentation displays to address the various operational conditions or states encountered by the vehicle and the operator. In this way, the disclosed system and method assist those individuals involved with the vehicle both during initial configuration of the operator control area, as well as thereafter during operation. Moreover, the customization and configuration of the instrumentation interface generally provides the operator with the capability to design and utilize specific display screens showing the data and information in the manner and location desired or appropriate for the operational circumstances. As will be described further below, the configuration and customization of the display screens allows the operator to, among other things, select the data or data type to be displayed at a plurality of gauge locations or sites on each display screen. To this end, customization data is collected to configure the display sites of the display screen, which may be arranged in accordance with a format or structure. The display format or structure, in turn, may be previously established by the vessel manufacturer or outfitter or, more generally, established in accordance with the characteristics of the vessel.

In some embodiments, the disclosed system and method assist the operator or other individual during the instrumentation interface configuration process by, for instance, automatically generating a matching or identical gauge at a mirror display site of the instrumentation interface, or automatically determining an appropriate gauge range based on user preferences, the data type displayed by the gauge, or characteristics of the display screen.

The instrumentation interface configured and customized by an operator may constitute only one of several different interface designs made available during operation. As will be described below, a user of the instrumentation interface system may create and configure a display screen, and then save a definition of the display screen for future use. The user or operator may then select between the various alternative instrumentation interface designs as desired, or as operational circumstances warrant.

Although well suited for, and described herein in connection with, marine vessels or vehicles, practice of the disclosed system and method is not limited to any vehicle type or application. Rather, the disclosed system and method may be applied in any number of contexts or applications in which a user has a number of sensors, instruments or other devices providing data and information to be monitored. The various instrumentation interface contexts and applications to which the disclosed system and method may be applied are also not limited to practice with any particular sensor, instrument or other data collection device. Moreover, practice of the disclosed system and method is not limited to the display of any particular type of vehicle data or information.

With reference now to the drawing figures, where like elements are identified with like reference numerals, FIG. 1 shows a marine vessel or boat indicated generally at 20 to which the advantages of the disclosed system and method may be applied. The boat 20 includes a marine propulsion system having a port engine 22 and a starboard engine 24, each of which has a number of sensors and other devices measuring operational parameters and providing data indicative thereof to a respective engine control unit (not shown). The engines 22, 24 use fuel from a port fuel tank 26 and a starboard fuel tank 28, each having respective sensors 30, 32 (e.g., level, flow, etc.) that monitor conditions associated with the respective fuel tank. Propulsion of the boat 20 is generally controlled via a steering mechanism (not shown) having a steering sensor 34, and a pair of trim tabs 36, 38 having associated trimmed tab control and sensing elements 40, 42.

Each of the aforementioned devices onboard the boat 20 is communicatively connected to a network or bus 44 for communication or transmission of the data or information collected or sensed thereby. The communication of data may include the exchange of data between the aforementioned devices, or may involve delivery of data to one or more controllers 46 that also may direct the operation of other devices, such as a global positioning system (GPS) device 48, a target acquisition or radar device 50, a depth sensor 52, and a wind speed sensor 54, to name but a few. Each controller 46 may direct communications over the bus 44 in accordance with a protocol, such as the SmartCraft protocol developed by Mercury Marine (Fond du Lac, Wis.). The SmartCraft protocol is designed to enable transmission of engine and other data over the bus 44, which may be a controller area network (CAN) bus, or any other suitable bus for such communications. Moreover, practice of the disclosed system and method is not limited to any particular controller technology, communication protocol or network bus configuration.

Generally speaking, the controller 46 includes an operator interface disposed in a control (or other) area of the boat 20. The operator interface may provide control functionality for a number of different onboard systems or devices, such as a marine navigation system. To that end, the controller 46 may include one or more Northstar 6000i units commercially available from Brunswick New Technologies—Marine Electronics (Acton, Mass.), or any other similar device suitable for displaying marine navigation and charting information. However, in this exemplary embodiment, the Northstar 6000i unit may be utilized to support the implementation of the disclosed system and method. As a result, the controller 46 may provide both marine navigation functionality and instrumentation interface functionality as described herein below.

Further information regarding the use of a marine navigation device such as the Northstar 6000i unit in connection with a network of devices on a marine vessel may be found in commonly assigned and co-pending U.S. patent application Ser. No. 10/967,962, entitled "Networking Method and Network for Marine Navigation Devices," which was filed on Oct. 18, 2004, the entire disclosure of which is hereby incorporated by reference. Furthermore, information regarding the manner in which the sensors, instruments and other devices connected to the bus 44 are initialized and incorporated as part of a control system managed by the controller 46 may be found in U.S. Pat. No. 6,382,122, entitled "Method for Initializing a Marine Vessel Control System," the entire disclosure of which is hereby incorporated by reference. As noted in the above-referenced patent documents, the controller 46 may, in fact, constitute a number of like devices that provide the same or similar instrumentation interface functionality. Accordingly, practice of the disclosed system and method is not limited to an embodiment having a single display device or other device for displaying the instrumentation interface.

Figure 2:
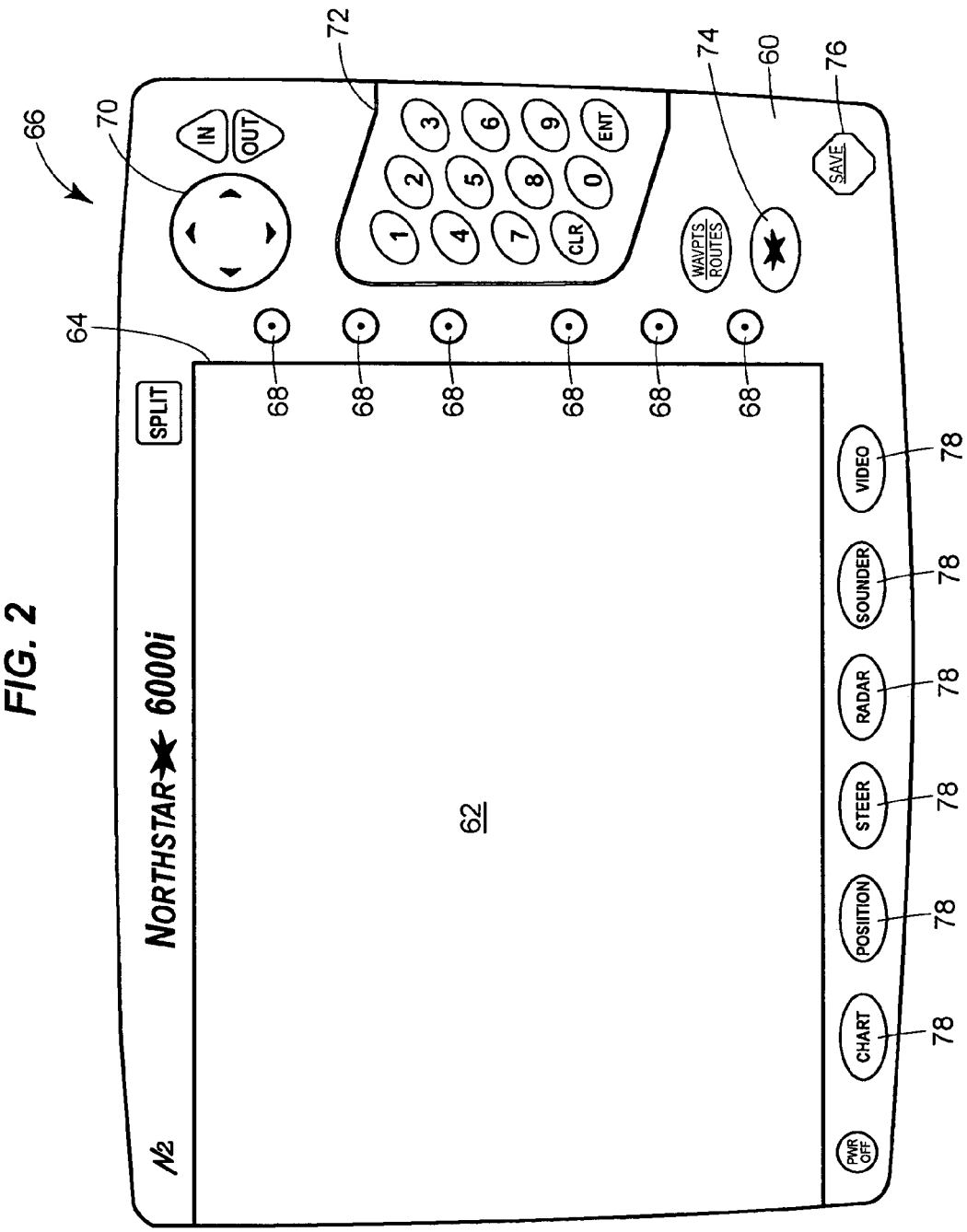
FIG. 2 is a schematic representation of a front panel of the instrumentation interface of FIG. 1 in accordance with an exemplary embodiment.

With reference now to FIG. 2, the controller 46, which may be located at a helm of the boat 50, includes a housing 60 within which is mounted a video output unit 62. The video output unit 62 may be a liquid crystal display (LCD), monitor or any other device suitable for displaying a screen or other image to the operator. Along an edge 64 of the video output unit 62 is a control panel indicated generally at 66, which in this exemplary embodiment includes six push buttons or keys ("softkeys") 68. In operation, textual, graphical, and other information is displayed on the video output unit 62 as a result of an operator's actuation of the softkeys 68 and other input devices disposed on the control panel 66. The softkeys 68 are generally associated with and identified by information displayed on the video output unit 62 in tabs or other proximal relation to the respective softkey 68. As a result, the softkey 68 may be used for a number of different functions, such as accessing a display screen or initiating a configuration process or procedure. The control panel 66 and, more generally, the housing 60 may include a number of additional buttons or keys in support of other functionality, including a cursor or directional key pad 70, a numerical key pad 72, a STAR key 74, a save key 76, and a number of other labeled or named keys 78. The functions of the keys 78 may be defined according to the context established by the information displayed on the video output unit 62, or may be fixed to initiating a respective process, such as a chart plotting procedure. The keys 74 and 76-may similarly provide functionality dependent upon the current operational state of the controller 46 or the subject matter currently displayed on the output unit 62. Further information regarding the keys 74 and 76 is set forth below in connection with one or more exemplary embodiments.

Figure 5:
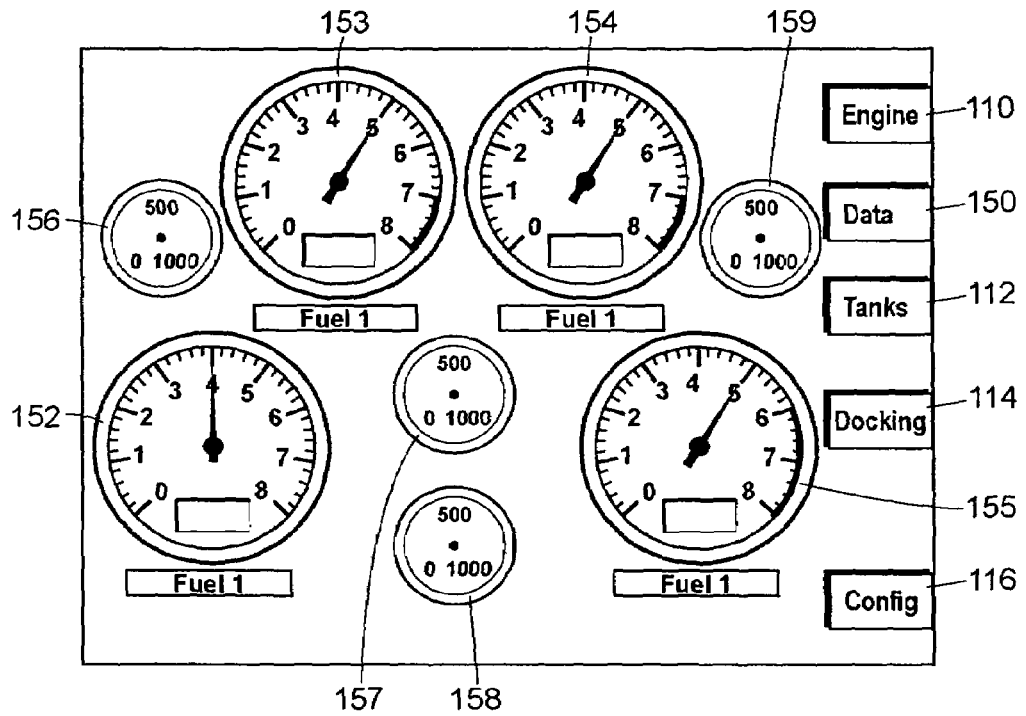
FIG. 5 is an exemplary tank display screen of the instrumentation interface of FIG. 1 in accordance with one aspect of the disclosure.

FIG. 5 schematically depicts hardware components of the controller 46 that may be utilized in connection with the implementation of the disclosed system and method in accordance with one or more embodiments. The controller 46 is shown in connection with a number of devices that may be coupled directly to the controller 46 rather than via the bus 44. Accordingly, practice of the disclosed system and method is not limited to embodiments or systems in which communication to, or from, the instrumentation interface is accomplished via a bus or network. For example, the controller 46 may be coupled to any number of input devices 80, such as an antenna assembly 82, which may be implemented with a wide area augmentation system (WAAS), a radar device 84, a sounder device 86, and an auxiliary video output unit 88, in a direct manner via an input/output (I/O) circuit or other hardware interface 90. The I/O circuit 90 may also provide a connection to the bus 44 as shown. The I/O circuit 90 may also support communications with the video output unit 62 and the control panel 66. The controller 46 may also use additional input or output circuits, such as a video circuit 92 dedicated to processing signals provided by a video input unit 94 or any other video-based I/O device.

Figure 3:
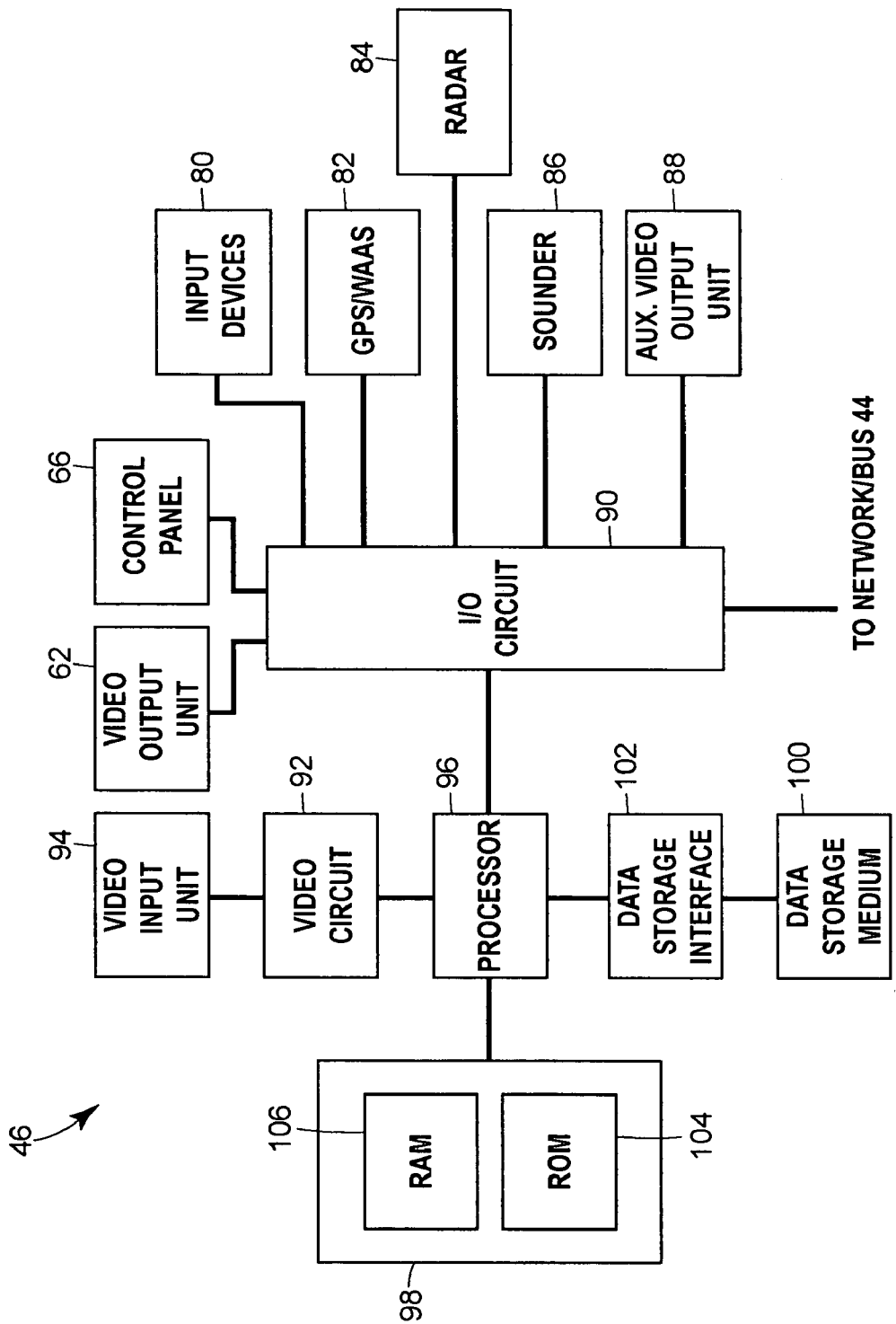
FIG. 3 is a block diagram of the instrumentation interface of FIG. 1 in accordance with one embodiment.

The controller 46 further includes a processor 96, a memory 98, and any number of additional data storage devices, such as a data storage medium 100 coupled to the processor 96 via a data storage data interface 102. The memory 98 may include a non-volatile portion or read-only memory (ROM) 104 and a volatile portion or random access memory (RAM) 106, while the data storage medium 100 may include or incorporate a disk drive, flash memory device, or any one or more other memory storage media. The connections between the processor 96 and the memories 98, 100 need not be as shown in FIG. 3, but rather may involve transmission over the bus 44 or a dedicated memory bus. Further information regarding the connections between the hardware components of the controller 46 and other hardware aspects thereof may be found in the above-referenced patent documents.

As described in detail herein below, the processor 96 and, more generally, the controller 46 execute or implement a number of routines to generate and manage an instrumentation interface having configurable and customizable display screens. The display screens may be dedicated to providing instrumentation information directed to a respective category or context for the operation of the boat 20. For instance, in one embodiment, the instrumentation interface includes three primary display screens, namely an engine display screen, a docking display screen, and a tanks display screen. Although alternative embodiments need not have the same number or types of display screens, the aforementioned primary display screens provide a useful way of compiling instrumentation information for the vehicle operator in a manner relevant to the operational state of the vessel. Thus, the generation of one of the display screens may also correspond with an operational state of the controller 46 and the software routines implemented thereby. To reach one of the display screens in one, exemplary embodiment, the operator, may, for instance, actuate the labeled key 74 (i.e., the "STAR" key). The STAR key 74 therefore provides a convenient way for the operator to exit an unrelated system, such as the chart plotter, and thereby generate the last one of the three primary display screens viewed.

When implementing the disclosed system and method for the first time, the three primary screens may present a default set of gauges. However, practice of the disclosed system and method generally provides a user with the capability of determining which gauges or other display items will be located at each location or site of the display screen. A default display may also be generated when a new device is connected to the bus 44, such as a new engine. In some embodiments, such as ones utilizing the auto detection feature described in the above-referenced U.S. patent, engines and other devices connected to the bus 44 are typically recognized and identified such that the default display screen includes a set of gauges and other display items that already take into account the sensors, instruments and other devices providing information to be displayed for that device. For example, certain engine types may include oil temperature and pressure sensors, where other engine types may not. The corresponding gauges would therefore be depicted in the former display screen, but not the letter. If the connected device is unknown or not recognized by the controller 46, a set of generic gauges may also be displayed.

In contrast to prior instrumentation interface displays, each of the primary display screens (e.g., engine, docking, tanks) are customizable and configurable to suit the needs of one or more operators of the boat 20. Details regarding the manner in which the customization or configuration is implemented are set forth below in connection with one or more embodiments. As a general matter, however, each display screen may be configured or customized in accordance with a number of aesthetic characteristics, such as the style, color or pattern of the background, bezel, face, needle, and any other feature of the display screen or its gauges and other display screen elements. The customization and configuration supported by the disclosed system and method also involves allowing an operator, boat manufacturer, or vessel outfitter to determine the gauges or other elements of the display screen itself.

Figure 4:
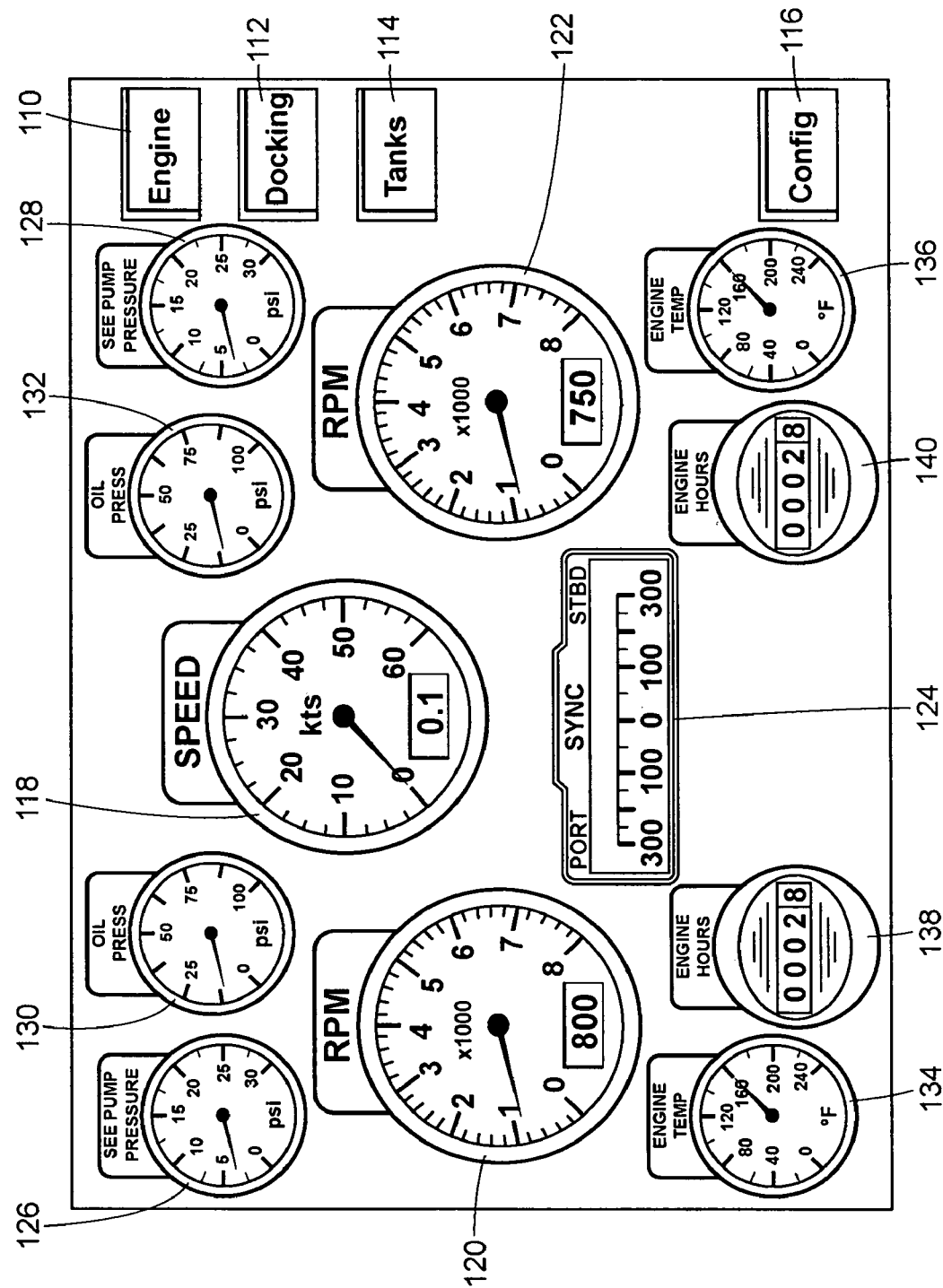
FIG. 4 is an exemplary engine display screen of the instrumentation interface of FIG. 1 in accordance with one aspect of the disclosure.

An exemplary engine display screen customized, configured and produced in accordance with one embodiment is shown in FIG. 4. In this case, a tab 110 is highlighted to signify that the display screen is an engine display screen, rather than one of the other primary display screens, which may be accessed by actuating the softkeys 68 adjacent to non-highlighted tabs 112 and 114. While the engine display screen tab 110 is highlighted, configuration and customization may be performed by actuating the softkey 68 adjacent to a configuration tab 116 in the lower right hand corner of the display screen. As shown in FIG. 4, the instrumentation interface provides in a single display information or data associated with a number of different sensors, instruments or devices. Such information would have typically been provided via a panel of physical, analog gauges located at the helm of the boat 20 or other control area. Without being limited to such analog gauges, the instrumentation interface produced by the controller 46 recreates the look and convenience of a console or panel of physical gauges, bar-type indicators, and other instrumentation items such that the engine and other operational information and data is provided concurrently. As shown, the engine display screen includes large-sized gauges, such as a speed gauge 118 and a pair of mirrored engine speed gauges 120 and 122. The engine speed gauges 120 and 122 may be considered to be "mirrored" in the sense that they are positioned on the display screen at sites symmetrical about a vertical center line, and identically configured to display data for the port and starboard engines 40 and 42, respectively. More generally, the display screen includes such mirrored gauges in a consistent manner such that the left hand side of the display screen corresponds with port devices and the right hand side of the display screen corresponds with starboard devices. Mirrored gauges thus provide a convenient way to depict instrumentation for sensors and devices replicated on the boat 20. For other gauges or other items, such as the speedometer 118, that provide information for devices that are not duplicated or replicated on the boat, one or more sites in the center of the display screen may be reserved. For example, a synchronization bar 124 depicts information provided by the engines 22 and 24 (and, specifically sensors or devices thereof) and processed by the processor 96 to determine the degree to which the engines are synchronized. In contrast, because each engine 22, 24 includes a dedicated pressure sensor for its oil reservoir and a dedicated sea pump pressure sensor, the display screen includes mirrored or paired gauges for each sensor. As shown, the display screen includes two sea pump pressure gauges 126 and 128 disposed at mirrored locations of the display screen, and oil pressure gauges 130 and 132 similarly disposed. Other mirrored gauges of the display screen include engine temperature gauges 134 and 136 and engine hour gauges 138 and 140.

The display screen and instrumentation interface of FIG. 4 is not limited to any particular gauge type or design, but rather may accommodate different types of gauges as well as non-gauge graphical items as described further herein below. To accommodate the different types, the disclosed system and method for customizing the display screen also provide the capability to adjust, in an automated fashion, a gauge range (e.g., 0-60 mph) based on one or more general characteristics of the display screen (e.g., its format), or one or more characteristics of the gauge in question.

The items shown in the display screen of FIG. 4 do not constitute the only display screen elements available for rendering on the engine display screen. Rather, a number of optional displayable items may be available given the engine type, configuration or other aspect of the engines 22, 24 and, more generally, the boat 20. For example, the engines may have associated therewith, or included therein, more than one sensor for determining speed, and the operator may choose to display the information provided by either one or both of the sensors. Other sensors or instrumentation information that may be made available in certain embodiments include steering angle, trim measurements, coolant temperature, engine voltage, any alarm values, fuel flow, any tank level, air or other temperatures, water depth, percent load, percent throttle, gear position, boost pressure, intake manifold temperature, gear oil pressure, gear oil temperature, speed over ground (SOG), course over ground (COG), a compass, and a video input (i.e., video camera image display). The forgoing list is provided, of course, with the understanding that the display items listed are by no means exhaustive, and various embodiments of the disclosed system and method may handle any subset or group of display items suitable for the instrumentation devices on the boat 20. Generally speaking, however, the engine display screen (or any other primary display screen) may present the types of instrumentation information monitored by an operator during operation of the engines 22, 24 for normal propulsion. In this way, the engine display screen produces the gauges and other display elements most useful during this operational state or condition.

Figure 6:
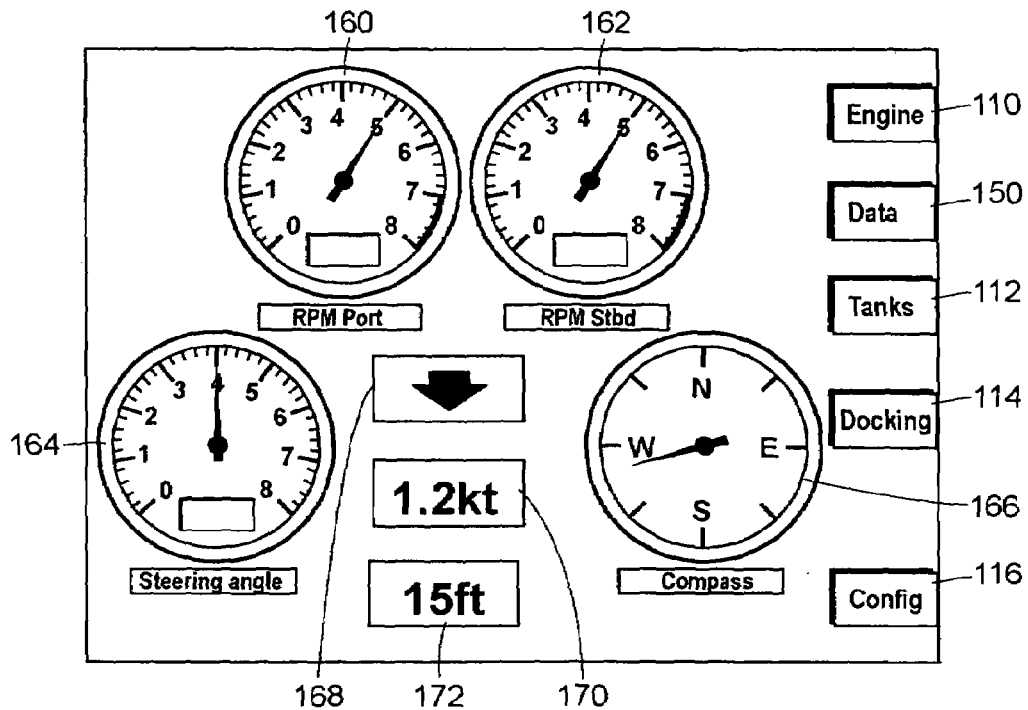
FIG. 6 is an exemplary docking display screen of the instrumentation interface of FIG. 1 in accordance with one aspect of the disclosure.

As described above, primary display screens in addition to the engine display screen include a tanks display screen and a docking display screen, examples of which are shown in FIGS. 5 and 6, respectively. These and other primary display screens may correspond with different operational states or conditions for the vehicle calling for a different set of instrumentation information and data to be monitored. With reference first to FIG. 5, the tab 112 is highlighted to indicate that the tanks display screen is currently depicted, while the other tabs 110 and 114 are not highlighted. In this embodiment, a data display screen accessible via a tab 150 may be configured to generally depict the instrumentation in digital form rather than for instance via analog gauges. The data display screen may constitute one of a number of additional display screens configurable or customizable in accordance with the disclosed system and method. The data display screen may also be useful in connection with providing a larger portion or amount of data or information in one display screen, inasmuch as the individual display items depicting the data in digital form may require less space on the display screen than a corresponding analog gauge representation.

With reference now to FIG. 5, the tanks display screen, as shown, may be in the midst of configuration or customization in accordance with the disclosed system and method. In this exemplary embodiment, the tanks display screen may be directed to monitoring those parameters of interest to the operator during a refueling stop. The display screen includes four large gauges 152-155 that have temporary legends or labels "Fuel 1," indicating, for instance, a placeholder for future designation of a label for the tank associated with the instrumentation information to be shown at that display screen site. In one exemplary case, the gauge 152 may correspond with the fuel level sensor 30 for the fuel tank 26, while the gauge 155 may correspond with the fuel level sensor 32 for the fuel tank 28. The gauges 153 and 154, in turn, may be associated with waste tanks, water tanks, or any other tank having a level or other sensor. The display screen further includes four smaller gauges 156-159 that, once assigned, may indicate information or data provided by tank-related sensors, such as fuel flow, total fuel flow, or other sensor types relevant to other tank types. Once the gauges 156-159 are associated with an operable sensor or instrument, a needle will be depicted to indicate the current value of the parameter being monitored. Thus, in some embodiments, the lack of a needle depiction may be indicative of an offline sensor or instrument, as well as a gauge for which the configuration process is incomplete.

With respect to FIG. 6, the docking display screen may include a number of gauges indicating operational parameters relevant to the docking of the boat 20, such as engine speed, steering angle and compass direction. In the example shown in FIG. 6, an engine speed gauge 160 is provided for the port engine 22, while an engine speed gauge 162 is provided for the starboard engine 24. Additional large gauges 164 and 166 provide indications of steering angle and compass direction, respectively. The docking display screen also includes a number non-gauge graphical items, namely a gear position indicator 168, and speed over ground (SOG) indicator 170, and a depth sensor indicator 172. These non-gauge graphical items may present digital values or, as shown in connection with the gear position indicator 168, an icon or other graphical item may be used to indicate the instrumentation information or data. In this case, the gear position indicator 168 depicts a down arrow for a reverse gear position, and an up arrow for a forward gear position.

Figure 7:
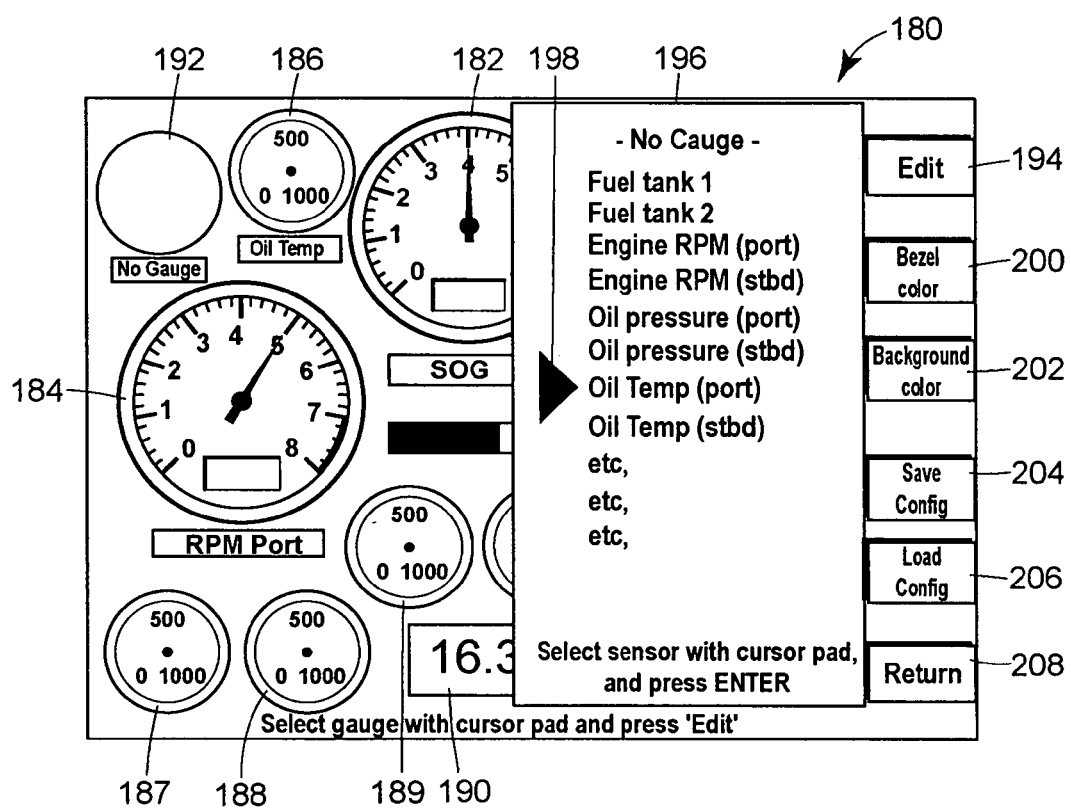
FIG. 7 is an exemplary configuration display screen of the instrumentation interface of FIG. 1 in accordance with one embodiment.

The manner in which an operator or other user of the disclosed instrumentation interface may create, design, configure or customize the exemplary display screens shown in FIGS. 4-6 is now described in connection with FIG. 7, which shows a configuration display screen indicated generally at 180. The configuration display screen 180 may be reached, accessed or otherwise generated by actuating the softkey 68 adjacent the configuration tab 116. Actuation of the softkey 68 associated with the configuration tab 116 initiates a configuration or customization routine for the current primary display screen depicted. In the embodiment shown in FIG. 7, an exemplary engine display screen constitutes the subject of the customization effort.

The configuration display screen 180 continues to show any gauges or other graphical items that have already been established or defined through the configuration process. In this case, a speed over ground (SOG) gauge 182 and an engine speed gauge 184, an oil temperature gauge 186, and a number of unassigned gauges 187-189 for the port engine 22, are provided. Also depicted is a graphical item 190 to provide an indication of, for instance, wind speed. At this point, the user configuring the engine display screen is attempting to add a gauge at a gauge location or site 192, where no gauge had previously been specified. The user may have selected the location 192 using the directional buttons or keys 70 on the control panel 66. Once the location 192 is selected or highlighted, actuation of the softkey 68 associated with an edit tab 194 causes an input panel 196 to be generated and displayed as part of the display screen 180. Specifically, the panel 196 prompts the user to select a sensor type using the cursor pad 70, after which pressing a button or key associated with "enter" formalizes the selection of the gauge type. As shown in FIG. 7, a triangular cursor or indicator 198 is positioned within the panel 196 to specify the current selection (e.g., an oil temperature sensor on the port side). If the user were to enter that selection, an oil temperature gauge would appear at the location 192 for further configuration.

The configuration display screen 180 supports additional customization of each gauge or graphical item on the display screen via a number of softkey tabs, including a bezel color specification tab 200, a background color specification tab 202, and others that may become available upon selection of a specific graphical item or gauge. For example, once the oil temperature gauge is disposed at the location 192, a softkey tab may be provided to allow the user to customize characteristics such as style and color for the gauge needle or other aspect of the display screen element.

The display screen 180 also provides a user with the capability of saving the configuration via a tab 204. The configuration may be associated with, or saved in connection with, a specific user such that different operators may have customized operation consoles or panels, thereby providing multiple instrumentation interfaces for the boat 20. Moreover, a single operator may also save different configurations of a primary display screen to address different operational circumstances, as desired. To these ends, a softkey tab 206 is provided to enable the loading of a previously saved configuration. Lastly, the configuration display screen 180 includes a return softkey tab 208 to allow the user to exit the configuration process, and return to the primary screen display.

Figure 8:
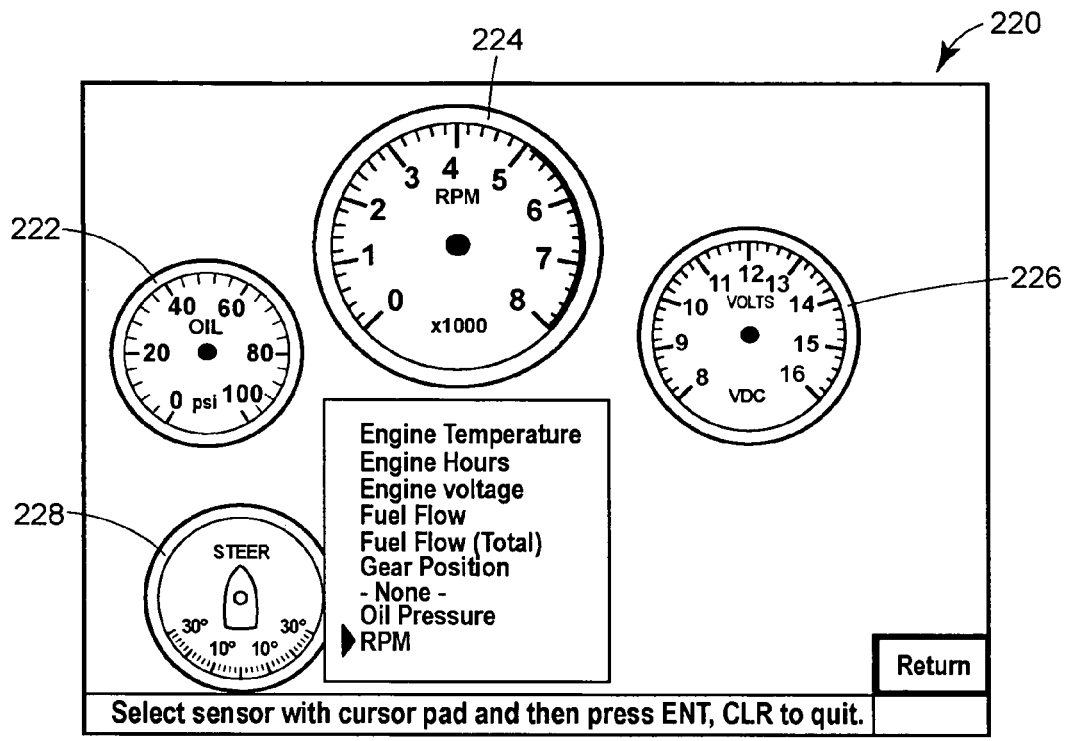
FIG. 8 is a further configuration display screen of the instrumentation interface of FIG. 1 in accordance with another embodiment.

FIG. 8 shows another display screen indicated generally at 220 and depicted in the midst of a configuration process. In this case, the vessel for which the instrumentation interface is applied includes only a single engine. In accordance with one embodiment, the disclosed system and method initialize the instrumentation interface to have a display screen format suitable for the single engine vessel. Specifically, a number of gauge sites or locations may be defined by the display format, and display site mirroring is disabled. Further details regarding display formats and display site mirroring are provided below. Generally speaking, the display format may specify the locations or sites that may support a display screen element, the nature or type of display screen element (e.g., gauge, bar, digital window, etc.), and the locations designated for large and small gauges. In the example of FIG. 8, the display format includes a total of five gauge sites, numbered 1-5 starting in the upper left hand corner of the display screen and proceeding clockwise. Using this display format, the user configuring the display screen 220 is provided with the capability to specify what data is to be shown at each location or site.

In some embodiments, the disclosed system and method may provide a subset of all of the onboard sensors and devices as those available for placement at a certain gauge location. The subset may be determined based on one or more display format parameters. For example, the first and second display sites of the display screen 220 have different size parameters and, therefore, may not have the same sensors assigned thereto as available. In some embodiments, these and other determining factors may be established in an options menu or otherwise set by the boat manufacturer or vessel outfitter. In this way, the boat manufacturer or vessel outfitter may control certain characteristics of the instrumentation interface, while leaving a great deal of customization and configuration for the individual boat operator.

The display screen 220 shown in the exemplary embodiment of FIG. 8 includes a number of gauges depicted during the configuration process. As a result, the respective needles of the gauges are not shown. However, each gauge depicts both the measurement units and the gauge range to be used during subsequent indications of instrumentation data. For example, the engine may include an oil pressure sensor that provides data to an oil pressure gauge 222, which shows that the sensor data is provided in pounds per square inch (psi). To this end, the controller 46 may access information stored in one of the memories 98 or 100 to determine that the oil sensor for this particular engine provides an output ranging from 0-100 psi. Generally speaking, the controller 46 looks for a gauge type in the memories 98 or 100 that closely matches and sufficiently covers the entire range. Similarly, the display screen 220 includes an engine speed gauge 224 indicating that the data is provided in revolutions per minute (rpm). Specified in one of the memories 98 or 100 may also be an indication of a redline or warning range specifying that engine speeds above about 5000 rpm should be denoted with a colored band as shown in FIG. 8. Also depicted in connection with the engine is an engine battery voltage gauge 226 that includes a range from 8-16 Volts dc and two sub-ranges directed to identifying excessively low and high battery voltages. Lastly, the display screen 220 includes a steering indication 228 that may be customized to suit either the capabilities of the steering mechanism or the sensor monitoring the mechanism.

Figure 9:
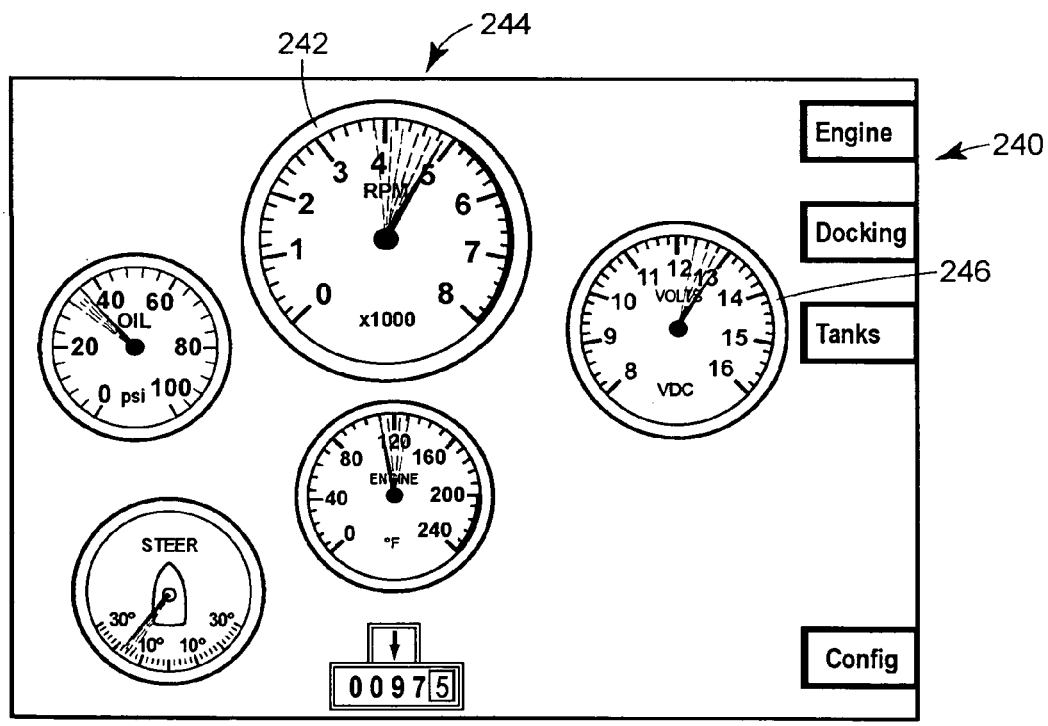
FIG. 9 is an exemplary display screen of the instrumentation interface of FIG. 1 showing a gauge needle motion trail in operation in accordance with one embodiment.

With reference now to FIG. 9, the display screens of the instrumentation interface may also be customized to include one or more gauges that depict a needle pointer or other indicator with a motion trail image to assist the user during operation. In one sense, the transition from physical analog gauges to the rendering of gauge display screen elements on a display device (such as the video output unit 62) is advantageous in the sense that the information or data may instantaneously and frequently updated without any needle hysteresis or other errors from the gauge itself. For example, there is no time delay waiting for a needle indicator to reach the new value of the sensed parameter. But an unfortunate consequence of instantaneous updates is that a quickly changing sensor value may appear to jump discontinuously between two needle positions. Another consequence is that the user monitoring the gauge display loses the perspective gained by watching a needle's motion from indicating one value to another. The needle motion trail addresses these unfortunate characteristics of gauge displays.

Generally speaking, the needle motion trail can provide a user with trending information that may otherwise be lost in the discrete nature of the instantaneous data updates depicted via the display device. In the exemplary embodiment shown in FIG. 9, an engine display screen indicated generally at 240 includes an engine speed gauge 242 having a needle indicating a current speed of approximately 5000 rpm. The gauge 242 includes a motion trail indicated generally at 244 that shows the recent progression of the engine speed from approximately 4000 rpm to the current value. This progression is depicted by the motion trail 244 via an image rendered in a region near the needle pointer. The image may, in some embodiments, include a pixelated representation of the needle pointer in increasingly solid form as it nears the needle. As a result, the motion trail image may take on a blurred appearance. In other embodiments, the motion trail 244 has a color that varies to further depict this progression. For example, the motion trail 244 may begin at a color close to the background color of the gauge 242. The background color of the gauge may be specified as a characteristic of the gauge face (e.g., the color black). Portions of the motion trail 244 closer to the needle pointer may have a color coincident with that of the needle. In between these regions, the color of the motion trail 244 may progress from the background color to the needle pointer color, which may also be changing to indicate a high, medium or low rate of change (or any other desired characteristic).

In some cases, the instrumentation interface may provide the user with the capability of activating or deactivating the motion trail feature either universally, for a specific display screen, or on a gauge-by-gauge basis. Furthermore, the instrumentation interface may provide the capability of customizing the behavior of a specific motion trail to, for instance, define a time constant for the decay of the motion trail. Such customization may be useful in the event that two gauges have differing update rates must accommodate variables that have widely different fluctuation rates. For example, an engine battery gauge 246 of the display screen 240 may not have any motion trail evident if the gauge 246 uses the same time constant used by the engine speed gauge 242 or a boat speed gauge.

Implementation of the motion trail feature is not limited to depicting changes in a needle pointer position, but rather may be applied to other graphical display elements as well. For instance, an engine synchronization display element using, for instance, a bar or triangular cursor (see, for example, FIG. 4) may similarly benefit from the depiction of an image trail.

Figure 10:
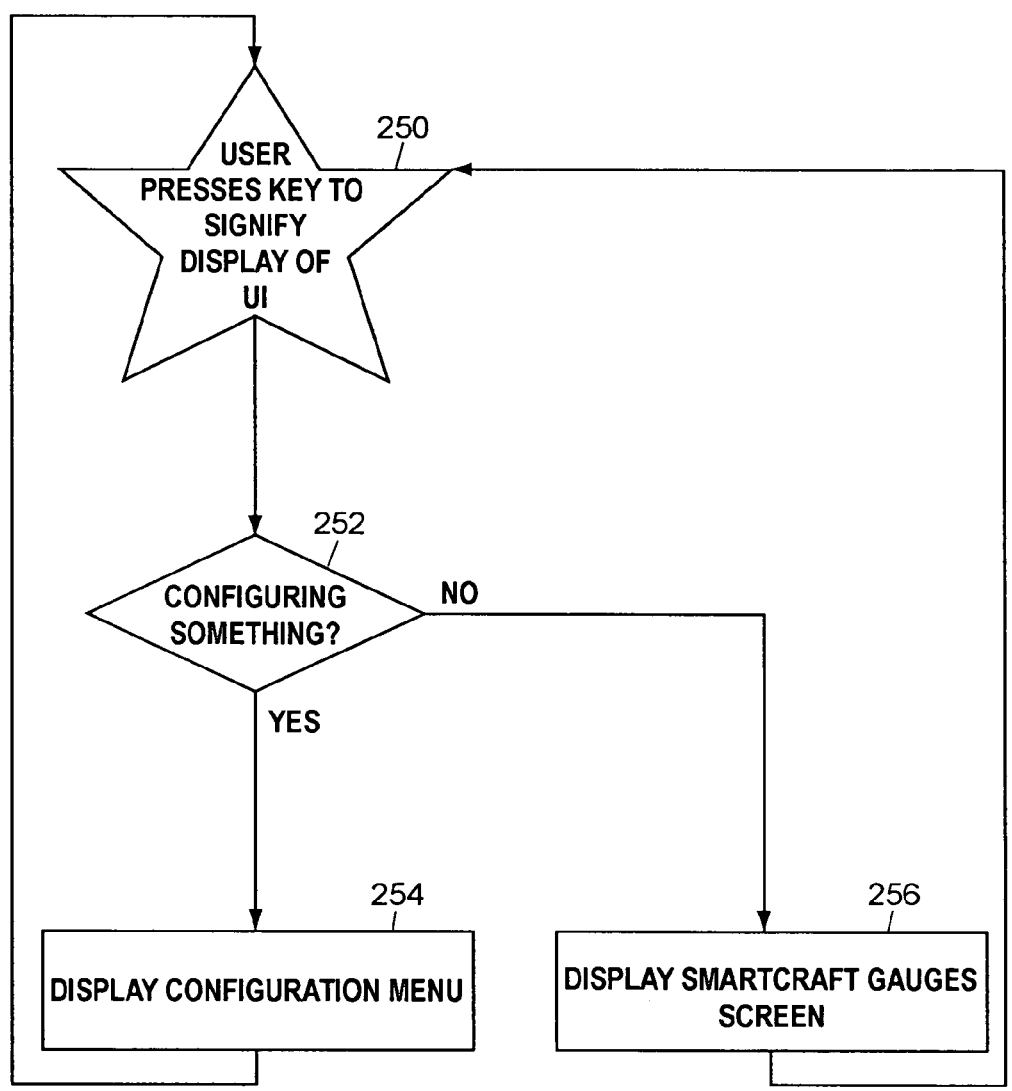
FIG. 10 is a flow diagram of a display screen control routine in accordance with one aspect of the disclosure.

FIG. 10 is a flow diagram depicting the customization or configuration steps taken in accordance with one aspect of the disclosed system and method. As described above, the user is provided with the capability of determining what instrumentation data is to be displayed at a particular display screen site or location. More generally, the user may customize other aspects of the display screen, as well as the gauges and other graphical items thereof, and their constituent components (e.g., needles, faces, bezels). To this end, the user may actuate a softkey or other key to initiate a customization procedure. More specifically, in one embodiment, the user presses the STAR key 74 (FIG. 2) in a block 250 and a customization process may be initiated. The STAR key 74 need not be the only key that initiates the customization process, and the state of the instrumentation interface may be determinative of whether the process may be initiated. For example, it may be determined in a block 252 whether the instrumentation interface is currently in a configuration mode or state. The configuration state may be entered by actuating the configuration softkey displayed in one of the primary display screens. In the event that the configuration state is the current state, a display configuration menu may be generated by a block 254 that generally provides a number of items for potential customization. For example, the configuration menu may provide a cursor for selection of one of a number of configuration menus (e.g., main, gauge, colors/styles, colors, needle, bezel, background, and load/save) from which customization functions may be initiated. If the current state is not a configuration state, then control passes to a block 256 that may cause a primary display screen to be generated and displayed. For example, if the current state of the instrumentation interface is associated with a chart plotter, the actuation of the STAR key 74 effectuates a return to the last viewed primary display screen (e.g., the engine display screen). Similarly, if the STAR key 74 is pressed while the user is viewing one of the primary display screens during operation, the block 256 may provide the option of toggling to a different primary display screen or, alternatively, effect the generation and display of the next primary display screen.

Figure 11:
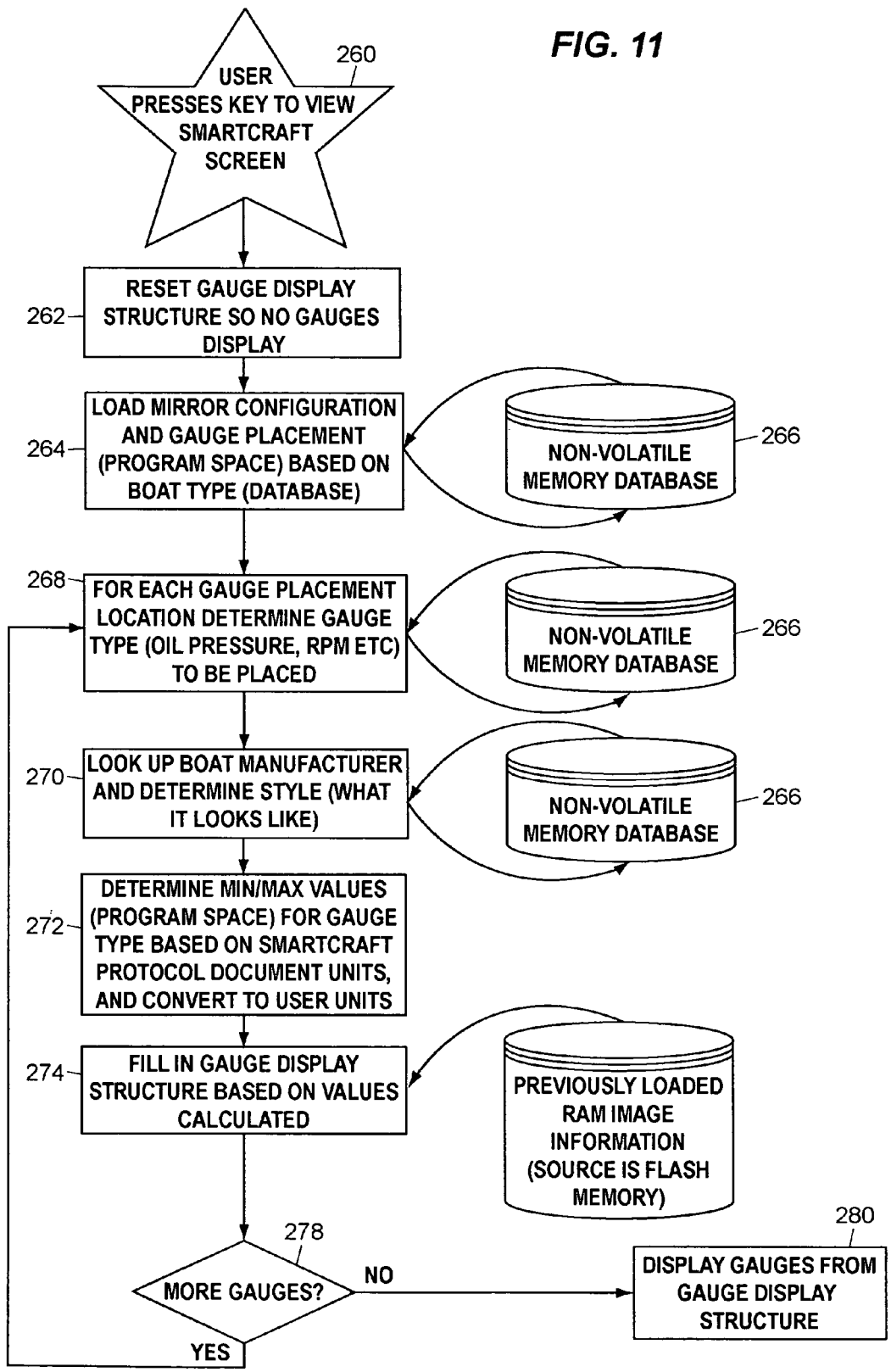
FIG. 11 is a flow diagram showing a display screen production routine in accordance with one embodiment.

With reference now to FIG. 11, the generation of each display screen includes the initialization of the format of the display screen and the application of customization data thereto. More specifically, each display screen has a display format that may be defined by the characteristics of the boat 20, namely whether or to what extent certain components or devices are present. As an example, if the boat 20 includes only a single engine, the display format for the display screen may reflect that a few centrally located, large gauge sites are available for a speedometer, tachometer, etc., along with six other smaller gauge sites. The engine screen for a dual engine vessel may have, for instance, a number of large gauge sites to accommodate the doubling of engine-related instrumentation, and only one large, centrally located gauge site for the speedometer. In each case, the boat manufacturer or other user may also specify where the gauge site locations are disposed on the screen, as well as the gauge site sizes and other parameters of the display format through an options screen or menu.

With continued reference to FIG. 11, one embodiment of the disclosed instrumentation interface method implements a display screen production routine each time a display screen is rendered in order to adjust to, and stay current with, user selections and customizations. Specifically, a display screen may be accessed by a user actuating in a block 260 a STAR key 74. As a result, one of the three primary display screens (e.g., whichever one was last shown) may then be generated and rendered in accordance with the exemplary routine shown in FIG. 11. In this embodiment, control first passes to a block 262 that resets or initializes a gauge display structure such that the display screen to be rendered includes no gauges or other graphical items. More generally, the gauge display structure establishes the display screen format for the display screen. The display screen format may specify a number of characteristics of the display, including the number of gauge sites or locations, the locations of the sites, the size of the gauges at the sites, the set of gauges or gauge types available for assignment at each gauge site, and any other aesthetic, structural or format characteristic of the instrumentation interface. After the gauge display structure is initialized, control passes to a block 264 that loads or accesses a mirror configuration and gauge placement data structure (or program space). The data structure may be stored in the data storage medium 100 (FIG. 3) or any other non-volatile memory 266. In some embodiments, the non-volatile memory 266 includes a database that specifies the gauge display structure data for a number of different boats, boat types, and other boat characteristics, such as onboard components (e.g., engine type). In this case, the block 264 loads the data structure associated with the boat for which the instrumentation interface is being produced. More generally, the data structure specifies the gauge types as well as gauge locations that are appropriate for mirroring gauges within a certain display screen. Accessing the data structure facilitates the definition of a display screen layout in accordance with the characteristics of the boat. In one example, if the boat has a single engine, the data structure specifies a mirror configuration that does not allow gauge mirroring to occur. In another example, the boat type (as specified for example by the boat manufacturer) may also not allow gauge mirroring to occur. When appropriate or permitted, however, data structures that allow mirrored gauge configurations assist in the configuration and customization of one or more display screens by automatically placing an identically configured gauge at a mirror location of the display screen so that the user need not duplicate efforts for instrumentation present at multiple locations on the vessel (e.g., the starboard and port sides).

After determining the display screen structure or format, information regarding the type of gauge is determined in a block 268 that may also involve accessing the non-volatile memory 266. In one embodiment, the block 268 determines the gauge type for a single display site or location, while in other embodiments the block 268 may determine the gauge type information for each display screen site. As shown in the exemplary routine of FIG. 11, control passes from the block 268 to enter a processing loop in which the block 268 is implemented separately for each gauge placement location. In this case, after each gauge location is addressed, control passes to a block 270 that again accesses the non-volatile memory 266 to determine style and other aesthetic information stored therein regarding how the boat manufacturer, vessel outfitter or other user wants the display screen to appear. For example, the block 270 may determine that each gauge should include a designation of the manufacturer name on the face of the gauge. More substantively, the block 270 may also determine that the boat manufacturer wants certain gauges to have more than one needle pointer or indicator on the same dial. For example, in a dual engine context, a single engine speed gauge may include two needle pointers in much the same way as an analog clock has two hands. More generally, the non-volatile memory 266 may store style, aesthetic or other preferences for the appearance of the gauge bezel, gauge face, gauge labels and other aspects of the graphical elements to be rendered on the display screen.

A block 272 next determines minimum and maximum values for the gauge type associated with the current gauge placement location or site. This determination may rely on data made available via the interface protocol, which may be a SmartCraft protocol. Specifically, the protocol may specify both the units of the measurement to which the instrumentation pertains, as well as a range for the instrumentation. However, the routine need not rely on the protocol for information other than the standard unit of measurement. In this way, the block 272 makes the determination based on data or information stored in, for instance, the non-volatile memory 266. In either case, the block 272 determines the minimum and maximum values, or range, by converting the standard measurement units to a measurement unit specified by the user. The user may specify a preferred measurement unit via an options or general configuration display screen that establishes universal parameters (e.g., metric, standard or nautical measurement units) for the instrumentation interface. The conversion to the user-specified measurement unit may force the block 272 to calculate, or recalculate, the minimum and maximum values, or range to be displayed by the gauge. For example, if the standard measurement unit for an engine temperature sensor is degrees Fahrenheit and the standard range for the gauge is specified as 0-240 degrees Fahrenheit, a user preference switching the measurement unit to centigrade results in a determination of a different numerical range, as well as a search for a suitable gauge that covers that entire range. A suitable gauge is one that most closely matches the calculated range, while still covering the entire range. Next, a block 274 populates the gauge display structure based on the minimum and maximum values calculated by the block 272. To this end, image data and information for the gauge may have been previously stored in the non-volatile memory 266 (e.g., a flash memory) in a compressed format. After the image data and information for the gauge is loaded into the RAM 106 in a non-compressed format in accordance with, for instance, the block 264, the block 274 stores a pointer in the gauge display structure indicative of the RAM storage location. In this way, the gauge display structure is set up to access the data at the time the display screen is rendered. Once the gauge display structure is fully populated, control passes to a decision block 278 that determines if the display screen has any further gauges for which the aforementioned aesthetics, style, range, units and other characteristics are to be specified. If more gauges remain, control passes to the block 268 for another execution of the blocks 268, 270, 272 and 274 for the next gauge site having a gauge. If not, control passes to a block 280 that displays or renders on, for instance, the video output unit 62, each of the gauges based on the information stored in the gauge display structure as a display screen that incorporates the modifications made by the customization data specified by the user as well as the format and structural settings of the display screen format.

The gauge display structure may be a data structure that specifies a memory address location for each of the characteristics or aspects of the gauge. In one case, the data structure may specify where the data is located in either the RAM 106 or other memory, such as the data storage medium 100. This way, the data structure may include a set of pointers that identify where the image and other data can be found or accessed at the time the display screen is rendered.

Figure 12:
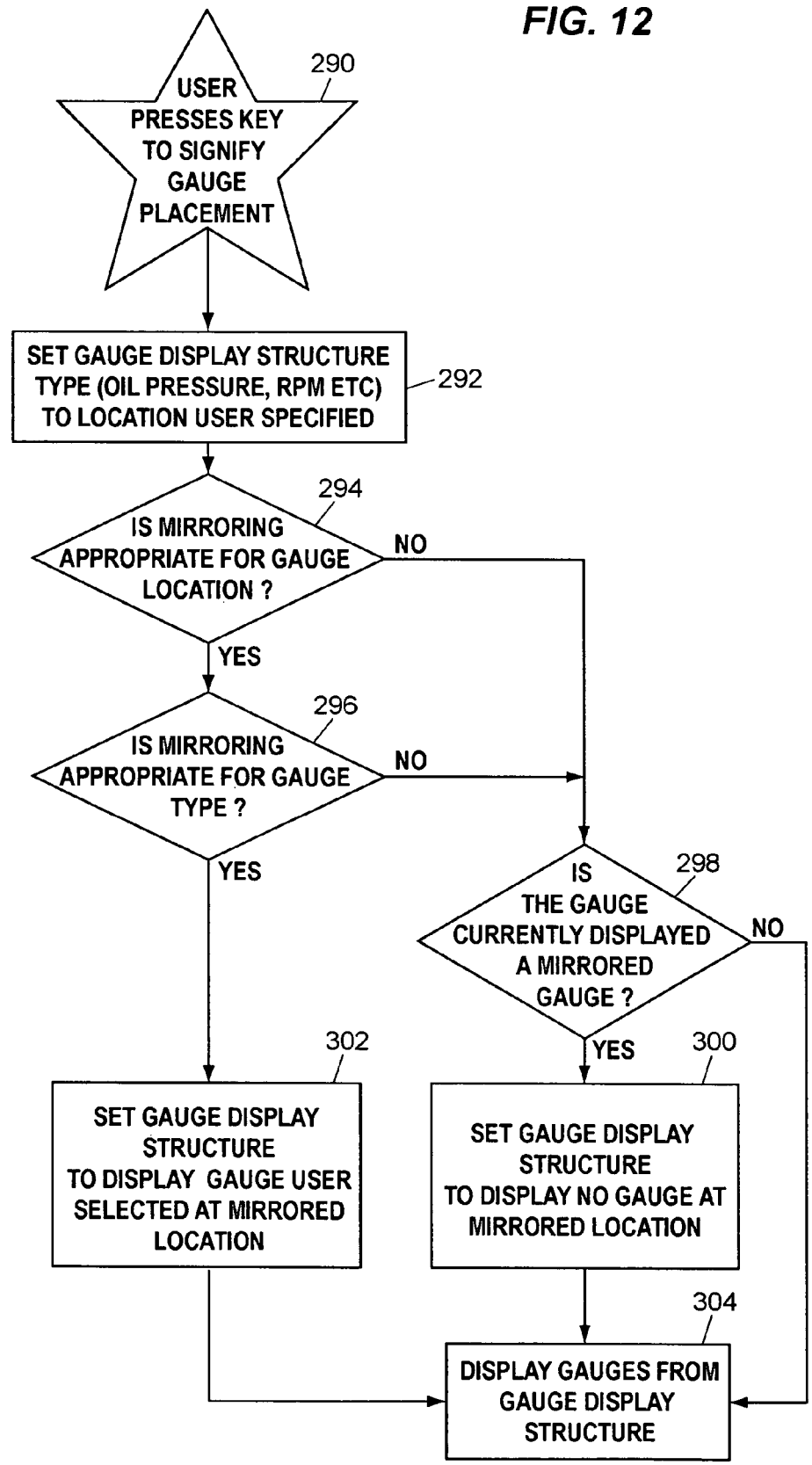
FIG. 12 is a flow diagram showing an automatic mirroring routine in accordance with one embodiment; and, FIG. 13 is a schematic representation of motion trail determination technique in accordance with one aspect of the disclosure.

With reference now to FIG. 12, shows a flow diagram of a gauge configuration or set up routine that automatically duplicates or mirrors a gauge specified by a user within a display screen. Automatic gauge mirroring may be especially useful in the marine vehicle context where a number of sensors, instruments or other devices are duplicated on the vessel due to, for instance, a dual engine configuration. In some cases, a device may be duplicated more than once if, for instance, a vessel has three, four or more engines. Generally speaking, the gauge mirroring routine may be implemented in connection with the user's specification of a gauge for a display screen location or site. For example, when the user selects a gauge from the panel 196 (FIG. 7) for placement at the display screen site 192 (FIG. 7), the routine may determine that the site 192 is appropriate for mirroring and proceed to duplicate the selected gauge automatically at the mirror site.

In the exemplary embodiment of FIG. 12, a user may initiate the gauge mirroring routine by actuating a key directed to gauge placement or assignment in a block 290. The panel 196 or other display item may then be generated in a block 292 to facilitate the selection of a gauge type. Once the gauge type is selected, the block 292 sets or determines the gauge display structure to reflect the selected type. Given the information set forth in the gauge display structure, the gauge mirroring routine generally evaluates whether mirroring is appropriate. Specifically, control passes to a decision block 294 that determines whether mirroring is appropriate for the gauge location. The data consulted to make the determination may be set forth as part of the display format for the display screen. Alternatively, or in addition, the data may be set forth in the gauge display structure because, for instance, the gauge type reflected in the structure may be indirectly indicative of whether mirroring is appropriate. Because only those gauge types that are appropriate for the display location are made available via the panel 196, the gauge type alone (as well as the gauge display structure more generally) may be indicative of whether mirroring is appropriate. Accordingly, in some embodiments, a block 296 may also or alternatively be implemented to determine whether mirroring is appropriate for the current gauge site. If mirroring is found not to be appropriate by both the blocks 294 and 296, then control passes to a block 298 to determine whether a gauge is currently displayed at the mirror site for the mirrored gauge. In that case, the placement of the gauge at the mirror site is erroneous, and a block 300 addresses the situation by setting the gauge display structure to display no gauge at the mirrored location. Conversely, if the blocks 294 and 296 determine that mirroring is appropriate for the gauge site and gauge type, then a block 302 sets the gauge display structure to display the appropriate gauge at the mirror site. In either case, control eventually passes to a block 304 that displays or renders the gauges from the gauge display structure in accordance with, for instance, the display screen generation routine of FIG. 11.

The configuration and generation routines described above may, in some embodiments, utilize a gauge data structure or tag that specifies a number of parameters to define an instance of a generic gauge type. The data may therefore, but need not, be set forth in an object-oriented fashion, in which characteristics of the gauge type are specified in an object class, and the specific values or settings of the class parameters are set forth in connection with each object or instance of the class. For instance, the gauge data structure or tag may have data specified for the following fields or parameters: type; current values; pixel location; display site index number; one or more memory pointers; a respective engine to which the gauge refers; a health indication directed to whether the sensor is operating or functioning appropriately; a sampling rate (i.e., an update frequency); a gauge range (i.e., a minimum and maximum values on the gauge face); measurement units; and, a gauge label (e.g., "engine temp"). In some embodiments, the gauge data structure may also include a generic gauge description for the gauge type, which may define one or more aspects, characteristics or components of the gauge. The gauge description, or more generally, the gauge data structure, may define the functionality of the gauge needle indicator, as well as a needle length, the size of the gauge in radians, and the width and height of the dial bezel, and other components of the gauge.

Figure 13:
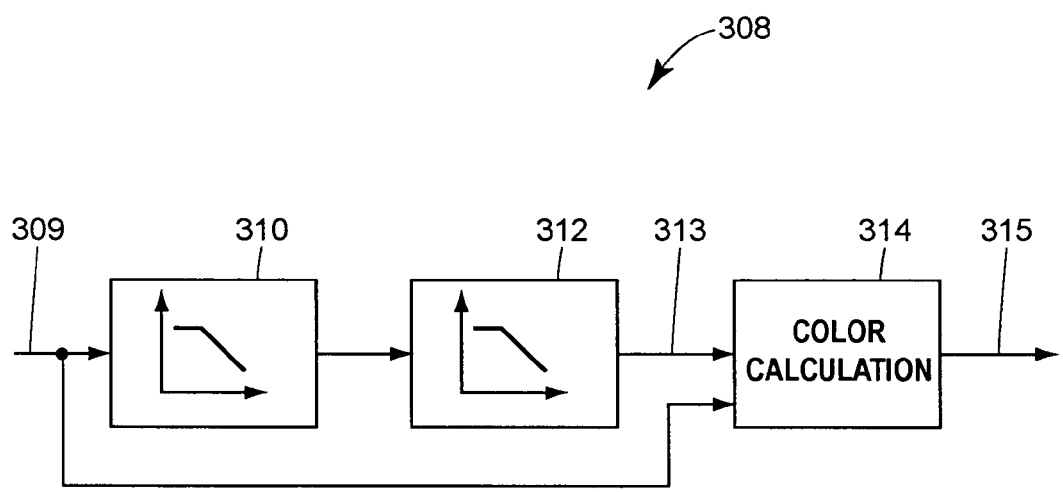

With reference now to FIG. 13, the needle motion trail 244 (FIG. 9) generated in connection with some aspects or embodiments of the disclosed system and method may be determined such that the width (or length) of the trail 244 roughly corresponds with the rate of change or movement of the needle. In some cases, the width of the trail may be proportional to, and therefore indicative of, the rate of change or movement. Specifically, a method of calculating or determining the motion trail may include a processing sequence that processes the incoming data stream representative of the instrumentation data. In the exemplary embodiment shown in FIG. 13, a system indicated generally at 308 provides an input data stream 309 to a first low-pass filter (LPF) 310. At any one point in time, the input data stream 309 represents the current value of the instrumentation data to be indicated by the gauge needle shown in the display screen. The output of the first LPF 310 may be provided to a second LPF 312 to establish a 6 dB/octave response for the system 308. While implemented in software, the LPFs 310 and 312 are the numerical equivalents of RC filter circuits well known to those skilled in the art. Accordingly, the needle motion trail 244 may be generated or determined in a variety of manners, and need not be implemented using software blocks as shown.

The output of the cascaded LPFs 310 and 312 is provided on a line 313 to a color calculation block 314, which, more generally, may provided comparative analysis or processing determinative of the characteristics of the motion trail 244. In this embodiment, the current value of the instrumentation data provided via the input data stream 309 is compared with the output of the cascaded LPFs 310 and 312 to determine the width of the motion trail 244. That is, the difference between the LPF output and the current data value is determinative of the width. Additionally, however, the block 314 determines color characteristics of the motion trail 244, insofar as the motion trail 244 is rendered as a fan of equal-angle, wedge-shaped portions having a respective color that varies from the gauge background color to the color of the needle.

In alternative embodiments, a different number of LPFs may be utilized to determine the width of the motion trail 244, and the color-related comparative processing need not occur if the motion trail 244 is, for instance, monochromatic. Still further, the motion trail 244 need not be determined by one or more LPFs, inasmuch as an indication of recent past values of the instrumentation data may be stored in a buffer, register or other memory for later comparison with the current data value. In such cases, the motion trail 244 may have a width corresponding with the difference between the current value and one of the past values. In any event, data indicative of the current value of the instrumentation data along with data representative of the motion trail 244 is provided on a line 315 to a display screen generation or other routine involved in presenting or rendering the instrumentation data in real time via the video output unit 62 or other display device.

Embodiments of the disclosed system and method may be implemented in hardware or software, or any combination thereof. Some embodiments may be implemented as computer programs executable on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processor or processing system includes any system that has a processing element, such as, for example, a general-purpose processor, a digital signal processor (DSP), a microcontroller, an application specific integrated circuit (ASIC), or a microprocessor.

The programs may be implemented in a high level procedural or object oriented programming language to communicate with the processor or processing system. The programs may also be implemented in assembly or machine language, if desired. In fact, practice of the disclosed system and method is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosed system and method may also be considered to be implemented as a machine-readable storage medium, configured for use with a processing system, where the storage medium so configured causes the processing system to operate in a specific and predefined manner to perform the functions described herein.

While the disclosed system and method have been described with reference to specific examples, which are intended to be illustrative only and not to be limiting, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of producing an instrumentation interface for a vehicle having a display device, the method comprising the steps of: initializing a display format for the instrumentation interface based upon which components are included in the vehicle, the initializing including determining gauge data for the vehicle given the included components; collecting customization data to configure a display site defined by the display format of the instrumentation interface; and, generating the instrumentation interface via the display device in accordance with the display format and the customization data for the display site, wherein the gauge data specifies suitable gauge types for the display site.

2. The method of claim 1, further comprising the step of applying the customization data to configure a mirror display site relative to the first-named display site.

3. The method of claim 2, wherein the applying step is implemented automatically based on whether mirroring is appropriate given the included components of the vehicle determinative of the display format.

4. The method of claim 2, wherein the applying step is implemented automatically based on whether mirroring is appropriate given a gauge type specified in the customization data.

5. The method of claim 1, wherein the collecting step comprises generating a list of the suitable gauge types to prompt a user for selection of a gauge from the list of suitable gauge types for placement at the display site.

6. The method of claim 1, wherein the display format specifies a plurality of gauge sites for a display screen of the instrumentation interface available for customization.

7. The method of claim 1, wherein the collecting step comprises selecting a gauge for the display site, and wherein the generating step comprises determining a gauge range for the gauge in accordance with the display format.

8. The method of claim 7, wherein the customization data comprises a measurement unit specification such that the gauge range determining step comprises converting a default gauge range of the display format to a customized range based on the measurement unit specification.

9. The method of claim 1, wherein the initializing step comprises accessing default display data for the display format, and wherein the method further comprises the step of modifying the default display data such that the display format reflects the customization data.

10. The method of claim 9, further comprising the step of storing a representation of the modified default display data reflecting the customization data as a customized display configuration.

11. The method of claim 1, wherein the instrumentation interface comprises a plurality of gauge display screens, and wherein the collecting step is implemented for a respective gauge display screen of the plurality of gauge display screens.

12. The method of claim 1, wherein collecting the customization data comprises collecting user preferences.

13. The method of claim 1, further comprising determining which components are included in the vehicle from a database based on a type of the vehicle.

14. The method of claim 1, further comprising displaying one or more characteristics of the component.

15. A computer program product stored on a computer-readable medium for producing an instrumentation interface for a vehicle having a display device, the computer program product comprising: a display initialization routine to determine a display format of the instrumentation interface characteristics based upon which components are included in of the vehicle, the initializing including determining gauge data for the vehicle given the included components;
   a configuration routine to collect customization data to configure a display site defined by the display format of the instrumentation interface; and, a display routine to generate the instrumentation interface via the display device in accordance with the display format and the customization data for the display site, wherein the gauge data specifies suitable gauge types for the display site.

16. The computer program product of claim 15, further comprising a display site mirroring routine to apply the customization data to a further display site.

17. The computer program product of claim 16, wherein the display site mirroring routine is implemented automatically based on whether mirroring is appropriate given the included components of the vehicle determinative of the display format.

18. The computer program product of claim 16, wherein the display site mirroring routine is implemented automatically based on whether mirroring is appropriate given a gauge type specified in the customization data.

19. The computer program product of claim 15, wherein the configuration routine comprises a user selection routine to list the suitable gauge types for selection of a gauge from the list of suitable gauge types for placement at the display site.

20. The computer program product of claim 15, wherein the display format specifies a plurality of gauge sites for a display screen of the instrumentation interface available for customization.

21. The computer program product of claim 15, wherein the display routine comprises a gauge range routine to determine a gauge range in accordance with the display format.

22. The computer program product of claim 21, wherein the customization data comprises a measurement unit specification such that the gauge range routine converts a default gauge range of the display format to a customized range based on the measurement unit specification.

23. The computer program product of claim 15, wherein the configuration routine modifies display structure data specified by the display format to reflect the customization data.

24. The computer program product of claim 23, wherein the configuration routine stores the modified display structure data as a customized display configuration.

25. The computer program product of claim 15, wherein the configuration routine collects the customization data by collecting user preferences.

26. The computer program product of claim 15, wherein the display initialization routine further determines which components are included in the vehicle from a database based on a type of the vehicle.

27. The computer program product of claim 15, wherein the display routine is further configured to display one or more characteristics of the component.

28. A system for producing an instrumentation interface for a vehicle having a display device, the system comprising: a processor; a computer-readable medium in communication with the processor; a display initialization routine stored on the computer-readable medium and adapted for implementation by the processor to determine a display format of the instrumentation interface in based upon which components are included in the vehicle, the initializing including determining gauge data for the vehicle given the included components;
   and a display generation routine stored on the computer-readable medium and adapted for implementation by the processor to generate a display screen of the instrumentation interface that is configured to depict via the display device customized instrumentation data in accordance with the display format, wherein the gauge data specifies suitable gauge types for the display site.

* * * * *